United States Patent
Angelo et al.

[11] Patent Number: 6,085,299
[45] Date of Patent: *Jul. 4, 2000

[54] SECURE UPDATING OF NON-VOLATILE MEMORY

[75] Inventors: Michael F. Angelo, Houston; Craig A. Miller, Tomball; David R. Wooten, Spring, all of Tex.

[73] Assignee: Compaq Computer Corporation, Houston, Tex.

[*] Notice: This patent is subject to a terminal disclaimer.

[21] Appl. No.: 08/974,734

[22] Filed: Nov. 19, 1997

Related U.S. Application Data

[63] Continuation of application No. 08/516,276, Aug. 17, 1995, Pat. No. 5,748,940.

[51] Int. Cl.[7] .................................................. G06F 12/16
[52] U.S. Cl. ........................ 711/163; 711/104; 711/156; 711/166; 713/200
[58] Field of Search ..................................... 711/163, 164, 711/103, 102, 155, 156, 166, 159, 104; 713/202; 380/4

[56] References Cited

U.S. PATENT DOCUMENTS

| | | | |
|---|---|---|---|
| 4,590,552 | 5/1986 | Guttag et al. | 364/200 |
| 5,241,657 | 8/1993 | Fine et al. | 395/501 |
| 5,293,610 | 3/1994 | Schwarz | 395/425 |
| 5,388,267 | 2/1995 | Chan et al. | 395/700 |
| 5,465,341 | 11/1995 | Doi et al. | 395/183.06 |
| 5,475,839 | 12/1995 | Watson et al. | 395/650 |
| 5,511,184 | 4/1996 | Lin | 395/734 |
| 5,522,076 | 5/1996 | Dewa et al. | 395/700 |
| 5,550,997 | 8/1996 | Ip et al. | 395/430 |
| 5,557,771 | 9/1996 | Kawaguchi et al. | 395/490 |
| 5,587,849 | 12/1996 | Kori et al. | 360/69 |
| 5,634,079 | 5/1997 | Buxton | 395/892 |

*Primary Examiner*—Hiep T. Nguyen
*Attorney, Agent, or Firm*—Sharp, Comfort & Merrett, P.C.

[57] ABSTRACT

A secure start-up system for a computer enables a flash memory to be reset in a secured way. Various operations are carried out to make sure that the reset is an authorized one, and to avoid unauthorized, e.g. virus, infiltration. These operations include multiple tests to avoid the probability of the reset being unauthorized. Any one or more than one of the following can be used. Flashing is only authorized when a special flash enable bit is set in the non-volatile memory. This flash enable bit is reset during every startup cycle. Flashing is only authorized from a cold boot as opposed from a warm boot. This minimizes the possibility of a computer routine authorizing flashing by a software reset. Flashing is only authorized from a floppy. This prevents a virus from writing the flashing routine to the boot sector of a non-removable disc. The user is warned prior to flashing, and asked to confirm. Finally, contents of the flashing routine can be checked using some kind of checking algorithm such as a secure hash algorithm.

30 Claims, 2 Drawing Sheets

SECURE UPDATING OF NON-VOLATILE MEMORY

This is a continuation of application Ser. No. 08/516,276, issued as U.S. Pat. No. 5,748,940, filed Aug. 17, 1995.

FIELD OF THE INVENTION

This invention relates to secure updating of nonvolatile memory.

BACKGROUND AND SUMMARY OF THE INVENTION

The present invention relates to a computer system which has a re-programmable start-up memory that is protected against unauthorized reprogramming. More specifically, the present invention defines a start-up system for a computer which takes certain steps to avoid unauthorized alteration of the computer's non-volatile memory.

Initial turn on of a computer executes instructions from a specified start-up routine. Many computers store the start-up routine in read only memory. It has become more common in recent years to store the start-up routine in nonvolatile random access memory ("NVRAM"). This allows the contents of the start-up routine (the basic input or output system or "BIOS") to be changed after initial manufacture to upgrade the start-up routine. The act of changing the content of the non-volatile memory is called "flashing" the memory.

The ability to change the BIOS, however, has opened a unique hole for viruses such as the "Meningitis" virus or other computer-infiltrating agents. Viruses often invade the operation of a computer in various ways. Many viruses render the computer subsequently unusable. If the BIOS is damaged, the computer cannot be started or starts in an unintended way. Hence, the computer operation is compromised. If sufficiently damaged, e.g., reset to zero, the BIOS cannot even be reprogrammed. This requires professional repair, e.g. shipping the computer back to the vendor for reprogramming.

Various measures have been taken to avoid virus infiltration into the BIOS.

For example, vendors have taken steps to avoid unauthorized reprogramming of the BIOS. A physical switch has been used. The switch must be set before the BIOS can be upgraded. People sometimes do not, however, reset the switch after they set the switch to upgrade for the first time. This leaves a later susceptibility to a virus resetting or infiltrating the NVRAM.

Another solution used by some manufacturers is to prevent the NVRAM from reset at any time except on initial boot-up. This solution allows the flash to be reset only when the system is first booted. One of the realizations made by the present inventor, however, is that this action does nothing to avoid the update routine itself being virus-infiltrated. This also does not prevent a virus from invading the boot sector of the hard disk in anticipation of the next boot cycle.

Moreover, once the virus-writers find out about a possible virus block, they find ways around the block.

The present invention takes various steps to prevent the contents of the NVRAM from being reprogrammed unless certain security measures are met. These security measures include any one or more of the following: (Using multiple different techniques makes it more difficult for a virus to circumvent any security measures.)

Flashing is only allowed on initial power-up to prevent a virus from resetting the NVRAM via a software reset.

Flashing is only allowed from a floppy disk, and not from the hard disk. This prevents a virus from infecting the boot sector of the hard disk, and then infecting the NVRAM the next time that the computer is power cycled.

Some aspect of the updating routine is checked to detect tampering.

Warnings are produced indicating that the system is to reflash. This prevents silently reflashing the system as is done by certain viruses.

The system prevents re-flashing unless a specific bit in the NVRAM has been set during a previous operation time. That bit is reset during every startup cycle.

Other advantages and features will become apparent from the following description and from the claims.

BRIEF DESCRIPTION OF THE DRAWINGS

These aspects will be described with reference to the accompanying drawings, in which.

DESCRIPTION OF THE PREFERRED EMBODIMENTS

Figure 1:
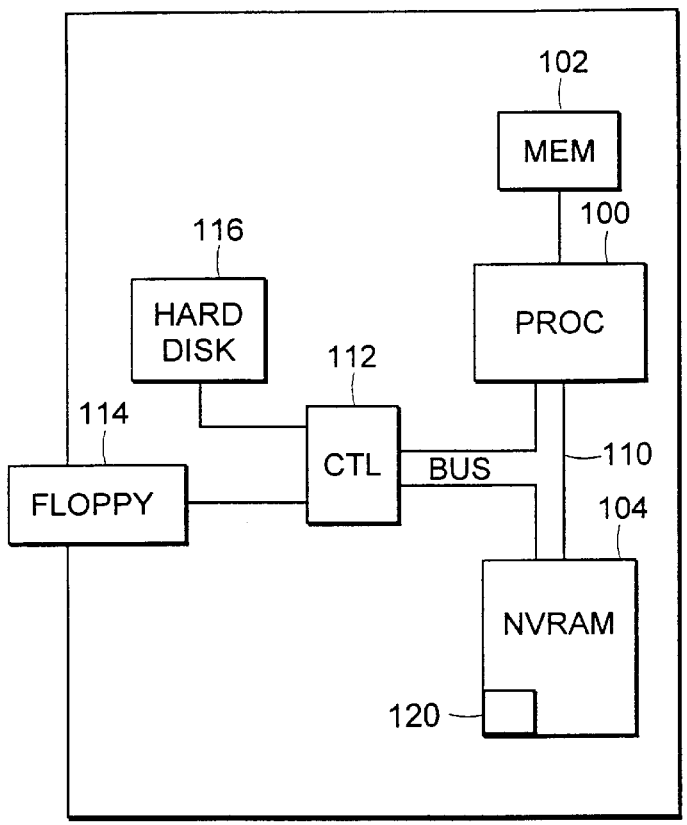
FIG. 1 shows a block diagram of the computer system.

All of the components of the system of FIG. 1 are common to both a personal computer and to mainframe computers. Processor 100 operates according to stored instructions to carry out certain operations. The instructions are stored in a working memory ("RAM"), shown as memory 102.

Figure 2:
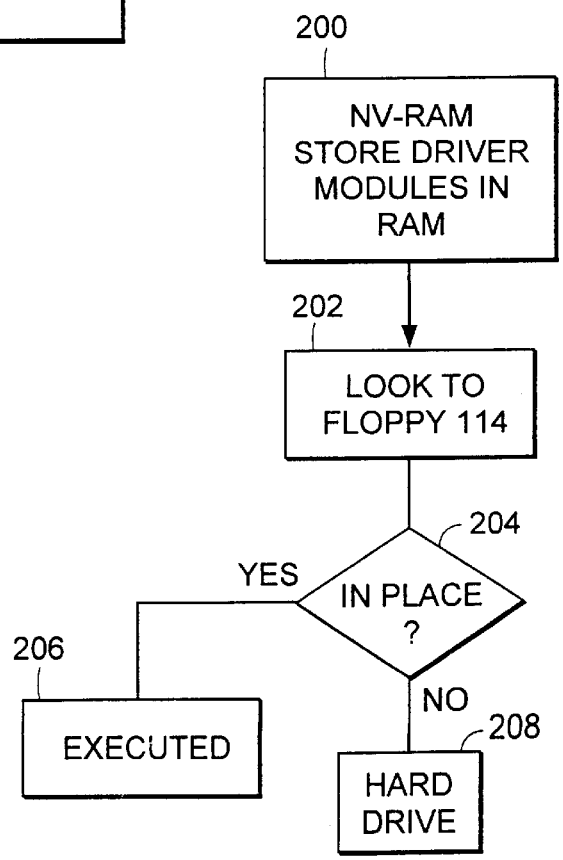
FIG. 2 shows a flowchart of operation of a startup routine.

On power-up, processor 100 always executes instructions from a certain area in NVRAM 104. These instructions define the initial start-up instruction sequence. The start-up routine operates to carry out the functions described in the flowchart of FIG. 2.

At step 200, driver modules are read from the NVRAM 104, and stored into the working memory 102. These driver modules include software instructions which enable the computer to carry out some of its housekeeping functions, including a driver module to interact with information on the data bus and with the software memory controller 112. The memory controller 112 can be, for example, IDE or SCSI controllers providing the interface between the address/data bus 110, removable media, e.g. floppy disk 114, and non-removable media, e.g. hard disk 116.

Once these initial modules are stored into RAM, further start-up instructions are obtained from the controller 112. The computer first looks for appropriate instructions on the floppy disk 114 at step 202. If the floppy disc is in place at step 204, commands from the boot sector of the floppy are executed at step 206 to store additional drivers and modules into memory 102. If the floppy is not in place, the information on the boot sector of the hard disk 116 is executed at step 208 to store the drivers into memory 102.

It is known that the contents of NVRAM can be altered based on a flashing routine, including an executable routine and data, which is stored on either the floppy disk or on the hard disk as part of the boot sector and/or boot sequence. The flash routine is read from the boot sector during a start-up sequence. This flash routine carries out various operations to remove the old routine which is resident in NVRAM 104, and to store a new routine. That new routine includes data that is stored into the NVRAM, and which represents the new, updated, start-up routines.

A first embodiment of the invention uses one or more of the following techniques to reflash NVRAM 104. These techniques, when properly used, make it more likely that the rewriting into memory will be secure.

(1) A flash bit 120 must be set in a specified location of NVRAM 104 to indicate that a subsequent flash update will occur. Flash is only allowed to occur when flash enable bit 120 is set. Flash enable is carried out by running a program which sets an otherwise unused bit in NVRAM 104. The flash enable bit is reset every time the system boots, whether or not the system is reflashing during that re-boot cycle, which prevents any subsequent reflash until the flash bit is again set.

(2) The system may only reflash when initiating a power up cycle (a "cold boot"). A "warm boot", that is, rebooting with the power on, will not allow reflash of NVRAM 104. Since the computer must be physically powered-down before re-flashing, no driver or routine can be used to reflash the system within any computer program. Without this technique, a software routine which restarts the computer (a warm boot) could not re-flash the NVRAM.

(3) The reflashing can only be carried out from data stored on a removable media, e.g. a floppy disk. Reflashing cannot be carried out from the hard disk. This prevents a virus from storing a routine on the hard disk which can later be used to reflash the non-volatile RAM. Since such a routine cannot be executed from the hard disk boot sector, the virus would have to store the offending program on the boot sector of the removable disc that was in the drive at that time. That same floppy would need to be in the drive on a subsequent boot-up, and would need to contain a bootable routine (e.g., a copy of a command interpreter stored on its boot sector). This makes the virus operation much less likely to succeed.

(4) The system prompts the user for confirmation prior to allowing flash to continue. This prevents flashing from occurring without the user knowing about it. It also requires that the user confirm that he wants flashing to occur. NVRAM cannot, therefore, be silently reflashed, e.g. as part of a virus program.

(5) The integrity of the flashing information is checked. Preferably, this is done by using the secure hash algorithm to check the flashing routine to ensure that those contents have not been altered.

The contents to be written in the non-volatile memory can also be checked. These contents include digital data that is executed as a program. This data can be checked according to the present invention. This is done by determining a digital signature of the data when it is recorded, using a hash code technique. The hash code is then encrypted using the private key of a public key cryptography system. At the time of memory update, the signature is decrypted using the public key. The decrypted signature is compared against an original to determine if the contents have been changed.

Combining the measures described above provides the maximum amount of protection. But any of these features may be used by itself, or they may be used in any combination to achieve varying amounts of protection.

Figure 3:
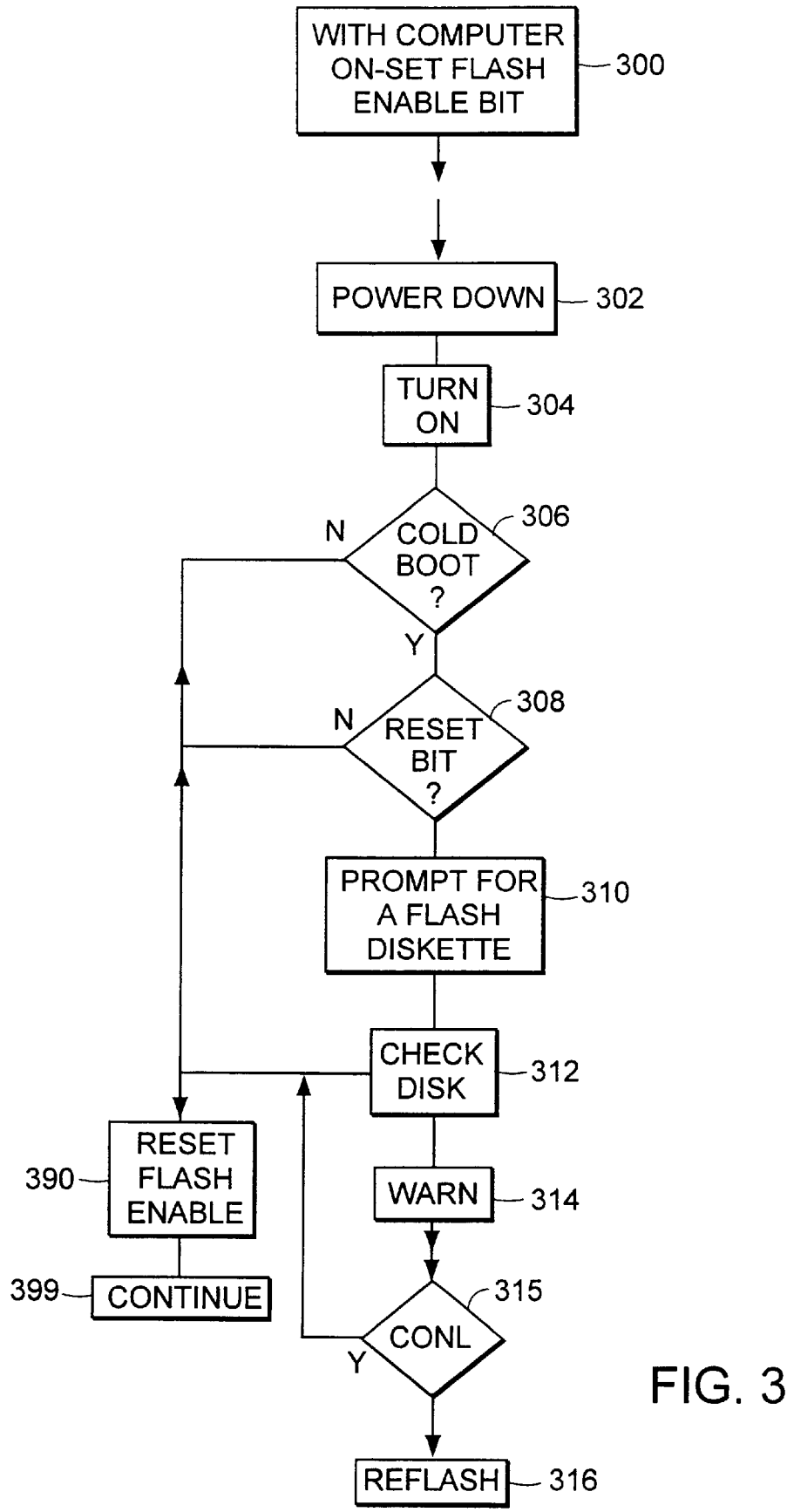
FIG. 3 shows a flowchart of operation of the secure system of the present invention.

The flash protection embodiment operates by using the processor 100 to execute the functions described in the flowchart of FIG. 3. FIG. 3 shows the flowchart of operations which are carried out to flash the NVRAM.

At step 300, with the computer on, a program is executed which commands that the flash enable bit 120 be set.

Step 302 represents powering-down the computer system.

Step 304 represents the computer reset.

Step 306 detects whether the current turn-on is a cold boot—that the system is being booted during a powering up cycle. In contrast, a warm boot is a reset of the processor caused by software or manual reset without disconnecting the power. The invention allows reset only on initial power-on to avoid software-based resets. One way to determine whether cold boot versus warm boot is occurring by detecting if there are any contents in memory that are being overwritten. Other techniques could also be used.

If step 306 determines that the present cycle is not a cold boot cycle, flow passes to step 390 where the flash enable bit is reset. This reset occurs during each start-up cycle, whether or not flashing is being done. After that, flow passes to the step 399, labeled "continue", which represents the continuing processing carried out by the computer.

If step 306 detects that the present startup is a cold boot, the reflash bit contents are checked and detected at step 308. If the reflash bit is set, the user is prompted for a flash diskette at step 310. The system monitors the source of the flashing, and will only accept flash data from a floppy disk. The flash diskette includes at least the data that is used to update the non-volatile memory 104, and can also include the executable file that is used to copy the contents into the NVRAM 104. The executable program has a secure hash algorithm or digital signature preferably the FIPS 180 standard. This operation generates a signature indicative of the whole contents of the executable code. Other techniques can be used to verify the contents, including calculating a checksum or other similar technique.

At step 312, the executable is checked against the signature. If the test passes, then control passes to step 314 which warns the user that the system is about to be reflashed. The set-up program preferably includes multiple warnings that the system is about to be reflashed. User confirmation is required at step 315. Failure of confirmation causes control to pass to step 390 where the flash enable is reset, followed by continuing without reflashing at step 399.

After warnings and appropriate confirmation, the reflashing occurs at step 316.

Although only the preferred embodiment has been described above, the claims which follow describe the intended metes and bounds of the invention, including many modifications which are possible in the preferred embodiment.

What is claimed is:

1. A computer system, comprising:
    a processor operating to execute instructions;
    a removable memory source; and
    a non-volatile random access memory storing instructions from which said processor initially starts up and which are selectively alterable under control of said processors;
    said processor including information which enables contents of said non-volatile memory to be altered only when information used to reset the contents of the nonvolatile memory is received by the processor from the removable memory source.

2. A system as in claim 1, wherein said processor also carries out an operation to enable the contents of the non-volatile memory to be altered only after determination that the computer system is being reset from a power off state.

3. A system as in claim 1, wherein said processor also carries out an operation to generate a prompt that the non-volatile memory needs to be reset, and carries out an operation to alter the non-volatile memory only after receipt of confirmation that said reset may proceed.

4. A system as in claim 1, wherein said processor carries out an operation to alter the non-volatile memory only after determination that a routine used to alter the non-volatile memory meets one or more predetermined criteria.

5. A system as in claim 4, wherein said criteria includes a signature from a secure hash algorithm.

6. A system as in claim 1, wherein said processor enables the contents of the non-volatile memory to be altered only after checking to determine that an enable value stored in said non-volatile memory is in a predetermined state.

7. A method as in claim 14, wherein said using step is performed only after determining that a predetermined value in said non-volatile memory is in a predetermined state.

8. A method of operating a computer system including a processor, for rewriting contents of a non-volatile random access memory storing instructions from which said processor initially starts up, comprising:

determining that a user desires to alter said contents of the non-volatile memory;

determining if information to be used by said processor to alter said contents is originating from a removable memory source of said computer system; and the processor operating to reset the contents of the non-volatile memory only in response to both (a) confirmation of said user desire and (b) determination that the information is originating from a removable memory source.

9. A method as in claim 8, further comprising altering contents of the non-volatile memory only after determining that a flash enable value in the non-volatile memory is set to a predetermined state.

10. A method as in claim 8, further comprising altering of the contents of the non-volatile memory only after determining that the system is being reset from a power off state.

11. A method as in claim 8, further comprising warning the user that altering is about to occur, and allowing altering of the contents of the non-volatile memory only after the user has been warned.

12. A method as in claim 8, further comprising a routine for altering the non-volatile memory, and further comprising comparing the routine against one or more predetermined criteria, and allowing contents of the non-volatile memory to be altered only if the comparing indicates a specified relation between said routine and said criteria.

13. A method as in claim 12, wherein said predetermined criteria include a signature of a secure hash algorithm.

14. A method of updating a startup routine in a computer, comprising:

obtaining an update routine used to update contents of the startup routine stored in a non-volatile memory in the computer;

checking an aspect of the update routine; and using the update routine to rewrite contents of the non-volatile memory only if said checking indicates that said update routine includes said aspect, and only after determining that the system is being reset from a power off state.

15. A method as in claim 14, wherein said checking comprises obtaining a signature indicative of some portion of the update routine and comparing said signature against a pre-stored signature.

16. A method as in claim 15, wherein said signature includes a secure hash algorithm.

17. A method as in claim 14, further comprising executing said using step only after determining that the new information to be stored in the non-volatile memory is to be obtained only from a removable memory source only.

18. A method as in claim 14, further comprising executing said using step only after issuing a user warning that reset of the non-volatile memory is about to occur.

19. A method as in claim 14, in which said using step is executed only after confirmation in response to said user warning, that reset of the non-volatile memory is desired.

20. A method of securely updating processor start up instructions stored in a non-volatile memory in a computer, comprising:

performing a first check to determine if an enable value stored in the non-volatile memory has a predetermined state;

performing a second check different than the first check to determine if altering the non-volatile memory is secure as well as to determine if said computer is being reset from a power-off state; and writing new contents into the non-volatile memory only when positive determinations result from both said first and second checks.

21. A method as in claim 20, wherein said second check includes determining that the instructions used to update the non-volatile memory do not originate from a source other than a removable memory medium.

22. A method as in claim 20, wherein said second check includes determining that a warning has been sent to an operator of the computer indicating that rewriting of the non-volatile memory will occur.

23. A method as in claim 22, wherein said second check further includes determining that the operator has confirmed that the rewriting can occur.

24. A method as in claim 20, wherein said second check includes determining that a checking code, indicative of integrity of a program that is used to update said non-volatile memory, meets predetermined criteria.

25. A method as in claim 24, wherein said checking code is a security hash code and said second check includes comparing said security hash code against stored data indicative of a proper hash code.

26. A computer system, comprising:

a processor;

a non-volatile memory storing predetermined instructions to be executed by said processor on initial start-up; and an element that provides instructions to update contents in said non-volatile memory, said element being arranged to check that an enable value stored in said non-volatile memory is in a predetermined state, and to perform at least another predetermined security check to determine that said system is being reset from a power off state, the element allowing new data to be written into the non-volatile memory only when said enable value has the predetermined state and the other predetermined security check indicates that updating the contents of said non-volatile memory is likely to be secure.

27. A system as in claim 26, wherein said predetermined security check includes verifying that said instructions used to update said contents are to be provided only from a removable medium, and proceeding with updating only in response to said verification.

28. A system as in claim 26, wherein said predetermined security check includes determining that a warning has been sent to an operator of the computer indicating that contents of the non-volatile memory will be changed.

29. A system as in claim 26, wherein said predetermined security check includes determining that a checking code, indicative of integrity of a program which is used to set the new data into said non-volatile memory, is in a predetermined state.

30. A system as in claim 29, wherein said checking code comprises a security hash code, said predetermined state of said checking code being a positive comparison of said security hash code against stored data indicative of a proper hash code.

* * * * *